(12) United States Patent
Shkedi

(10) Patent No.: US 6,832,207 B1
(45) Date of Patent: Dec. 14, 2004

(54) SUPER SATURATION METHOD FOR INFORMATION-MEDIA

(75) Inventor: Roy Shkedi, New York, NY (US)

(73) Assignee: Almond Net, Inc., New York, NY (US)

( * ) Notice: Subject to any disclaimer, the term of this patent is extended or adjusted under 35 U.S.C. 154(b) by 926 days.

(21) Appl. No.: 09/723,391

(22) Filed: Nov. 28, 2000

(51) Int. Cl.$^7$ .......................... G06F 17/60; G06F 17/00
(52) U.S. Cl. ....................................................... 705/14
(58) Field of Search ........................................... 705/14

(56) References Cited

U.S. PATENT DOCUMENTS

| | | | |
|---|---|---|---|
| 2001/0041566 A1 * | 11/2001 | Xanthos et al. | 455/423 |
| 2002/0124098 A1 * | 9/2002 | Shaw | 709/231 |
| 2003/0028451 A1 * | 2/2003 | Ananian | 705/27 |
| 2003/0110497 A1 * | 6/2003 | Yassin et al. | 725/42 |

* cited by examiner

*Primary Examiner*—James W. Myhre
(74) *Attorney, Agent, or Firm*—John A. Galbreath

(57) ABSTRACT

A super-saturation method for information-media substantially relates to a three-body cooperation to direct information to an electronic media consumer (reader, surfer, viewer, listener, etc.). Embodiments of the present invention facilitate a first media body substantially offering out of context information placement using a second cooperating media body. A facilitator body preferably guarantees that a consumer of the second media is a known consumer of the first media. Accordingly, the second media body presents an out of context information placement. For example, an exclusive members-only Internet site "AAA" is oversubscribed with potential paying advertising content at $100 CPM. This exclusive site then offers unfulfilled advertisers an option to present their advertisements to certified "AAA" viewers, albeit on a non-AAA Internet site, for $50 CPM. The facilitator locates a certified AAA viewer at an Internet site "BBB" that normally charges $30 CPM. A facilitated contract(s) between AAA, BBB, and the facilitator divides a new revenue stream of $20 CPM between them—and each of the three bodies benefit.

123 Claims, 2 Drawing Sheets

SUPER SATURATION METHOD FOR INFORMATION-MEDIA

FIELD OF THE INVENTION

The present invention generally relates to a method for distributing information-media contents. More specifically, the present invention relates to expanding the revenue from information capacity of the media.

BACKGROUND OF THE INVENTION

Data communications systems have evolved from simple methods of conveying information. In ancient times messages were carried by word of mouth. Later, messengers on foot carried hand-carved messages on stone tablets. This further evolved, as handwriting developed, to handwritten messages on papyrus, leather and then paper carried by foot messengers and later by messengers on horseback. Already, in those early times, there was a natural limit to the amount of information that any one messenger could carry.

The advent of manual signaling from hilltop to hilltop was followed, with the arrival of electricity on the communication scene, by the electric telegraph. The amount of information that could be conveyed took a quantum leap forward. Again, there was a natural limit to the amount of information that could be carried by this new medium. At the turn of the last century, radio made its first tentative appearance on the communication scene. The flow of information seemed to have taken another quantum leap forward.

In the middle of the last century, with the advent of the first computers and television, the communication age seems to have finally burst through all the limits of previous millennia. The past decade saw increases in the flow of information facilitated by developments of the Internet, cellular telephones and various wireless communication devises. All these have apparently broken prior historic limits to the flow of information. However, this is not the case. Another limit has become apparent, namely the limit of human capacity to peruse this vast flow of information to the point of saturation.

An additional problem has also become apparent with the growth of the Internet and other data communication systems. Communication media are also being used for another purpose, in parallel with transmitting core information. This is the transmission of special messages alongside the core information. Special messages include advertisements, notifications, legal notices, credit warnings and a host of other items. These messages are both single directional or interactive between sender and targeted recipient.

Generally, special messages are carried in a number of media. For example, advertisements are included in newspapers and magazines, on Internet Web sites, over cellular telephone media, radio, television and many others. The amount and proportion of such special messages that can be carried in a media is limited by a number of factors. These include aesthetic, physical and financial considerations. It would seem that these limiting factors may be expressed as the ratio of the amount of special messages to the quantity of core information. When the proportion of non-core information reaches a point of unacceptability to a viewer or reader, this point is termed saturation. Even for a media predicated on 100% special messages, there is a physical upper limit.

Typically, in an Internet Web site, it has become commonplace to have a variety of special messages. These typically include advertisements with or without hyperlinking to other Web sites or other Web pages. In much the same way, magazines and newspapers carry special text and graphic messages in the form of advertisements, legal notices and so on. Again, there is an upper limit, even for print media predicated on 100% special messages.

Either due to physical limitations or due to reaching an unacceptable ratio of special messages to core information, media reach the point of being unable to carry additional special messages. This saturation represents a financially limiting problem to that media after a popular media has a waiting list of advertisement orders. For this reason, many methods are used to try to extend this saturation point, for example, by using hyperlinks on a Web site, by adding supplements to newspapers or magazines, by adding special message supplements to credit card billing and many others. These techniques merely appear to delay the onset of saturation and is often rather ineffective. In some cases, it is undesirable, for financial considerations, to extend the physical size of the media. Therefore, a magazine may be limited to a specific number of pages and a Web site to a specific number of web pages. Equally, it is vital that aesthetics of any media be taken into consideration so that readers or viewers are not overwhelmed with the multiplicity and density of information represented by such saturation, making a media appear unfriendly and overwhelming. There is, then, a need for a method to reach beyond this point of saturation in a media.

Advantages, Objects and Benefits of the Invention
Technical Issues:

The natural limitation to the quantity of special messages that may be applied to a data communication media is itself not a technical problem but rather one of financial, aesthetic and pragmatic considerations. However, the present invention provides a very technical solution to the saturation of many communication media. In essence, the present invention provides a solution by avoiding the characteristics causing saturation. This solution is achieved by making an alternative site in the same or an alternative media available for additional special messages, generally using existing modules and technology.

Ergonomic Issues:

Viewing a magazine that is supposed to be informative, but consists of a disproportionate amount of advertisements and other notices, is highly irritating. Viewing an Internet Web site for specific information only to find that it consists of advertisements, notices, warnings and other messages is no less problematic. Apart from the financial and physical implications, there is also a significant aesthetic problem. In general, communication media exist for reasons of economics. Finding a media that is aesthetically displeasing or too packed with information extraneous to the core information, will ultimately result in a loss of visitors to the site or readers to buy a magazine. The present invention addresses both the aesthetic problem and loss of revenue by a media site unable to accommodate additional special messages. Another important aspect of the present invention relates to using generally existing, known modules and technology, making implementation transparent.

Also, sales persons will require no special or additional training in the techniques involved.

Economic Issues:

Imagine having sold all the available advertising space in a magazine and then receiving inquiries for additional advertising space. This is the essence of the financial problem addressed by the present invention particularly in the context of electronic media such as Internet. Selling additional advertising space accessible in an alternative site or data communication media, even at a somewhat reduced price, represents a significant financial advantage to the magazine or broadcaster site. The present invention, by making additional space available, either at an alternative site or in an alternative media, provides an innovative and very financially attractive solution generally using existing modules and technology in an unobvious way. Revenue from this resource would not ordinarily have accrued to the original advertising media site without having an alternative to an otherwise fully subscribed advertising site.

Moreover, a web site or magazine realize that no matter how big it is, the traffic to an aggregate of sites is always bigger than the traffic to one site and on a personal level, the number of pages seen by a reader of a web site within the web site is usually smaller than the number of the pages the web site reader reads elsewhere. Due to the aforementioned a web site with 20% of sold ad space and 80% unsold ad space might prefer to let its advertisers reach its audience outside of its web site in return for a lower price than lowering its price within the site and the reasons are clear, the number of pages the visitor will read outside the site are bigger than the number of pages the reader will read within the site and therefore it is preferable to the web site to sell its advertisers the visitor to its web site outside its site for a lesser site though but for a bigger number of exposures. Selling the visitor to its advertiser while not within the site (OUT OF CONTEXT ad) enables the site to reduce price without devaluing its relationships with the advertisers on the site it self.

Notices

The present invention will forthwith be described with a certain degree of particularity, however those versed in the art will readily appreciate that various modifications and alterations may be carried out without departing from either the spirit or scope, as hereinafter claimed.

In describing the present invention, explanations are presented in light of currently accepted data communications theories and media models. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching, the current man of the art or the current team of the art, how these embodiments may be substantially realized in practice. Alternative or equivalent explanations for these embodiments may neither deny nor alter their realization.

Furthermore, in most instances in the context of the present invention, an example of a facilitation is an offer; in other instances, a facilitation may be appreciated to include performance of an activity or an acceptance—as will forthwith be further appreciated by examples provided in the following Glossary.

Glossary

Broadcaster: A broadcaster is a participant in a distribution of electronic signals—be they digital signals, analog signals, or the likes. For example, in the context of the Internet, a broadcaster is preferably a media owner. In the broad context of interactive bi-directional electronic communications, a broadcaster is a predetermined party in a transmission path from a present communications initiator to a present designated recipient—for example a telephone call initiator, any repeater in the interconnection of that call to the recipient, or the recipient. Furthermore, in the context of today's hybrid electronic media, a broadcaster may be a programmable component that can be inserted into the caller to recipient path.

Conjunction: In the context of the present invention, the expression "in conjunction" relates to a division of work between parties, such as between an agency and a broadcaster. This division may be of any proportion—so long as a nominal task remains for one of the parties to accomplish. In some circumstances, there is a definite preference for the division of labor to have a specific predefined asymmetry, while in other circumstances the division may occur using a simple easy to accomplish criteria. Furthermore, sometimes there is a specific bias as to which party performs some specific aspect of the conjunctive task, for example, according to a concern to preserve privacy, etc.

Cookie: A Cookie is a message given to a Web browser by a Web server. The browser stores the message in a text file called cookie txt or a cookie directory or the likes. The message is then sent back to the server each time the browser requests a page from the server. Cookies serve as recognition symbols or messages in a particular Web browser that can be recognized and acted upon by that cookie placing Web server.

Offsite Content: In the context of the present invention, offsite content is content that derived from outside of the immediate local context of a present site. For example, on an Internet page, an offsite content may be a banner or may substantially be the result of clicking on a hyperlink to another page (be it in the same internet site or in another internet site) especially when the hyper link is to outside of the current page. In the context of a telephone conversation between two parties, a audio time pulse placed by the telephone service provider is also an example of an offsite content. Likewise, "piped in" background music that a caller hears when waiting for his call to be transferred is an example of an offsite content.

Super-saturation: In the context of the present invention, the term Saturation simplistically describes a situation where a data communication media site contains a maximum predetermined amount of content presentation apart from core information. This content presentation may be in the form of advertisements, notifications and other information not directly associated with core data. Maximum amount of content presentation is limited by physical, aesthetic and pragmatic factors. Exceeding this saturation level leads to the state of out of context media fulfillment, that is, containing more content presentation than is desirable, pragmatic, physically possible or aesthetically pleasing.

Alternatively, in the context of the present invention, a more pragmatic definition for the term Saturation relates to a current level of predetermined content in a specific media instance; for example a web site currently has sold 20% of the space that it has allocated for advertising. In the nomenclature of the present invention, this represents a level of actual saturation of 20% of available in context advertising potential. The present invention generally relates to a super-saturation method whereby a new revenue stream is created by facilitating out of context potential (for advertising or otherwise) that is in excess of any actual saturation—be it 20% as in the pragmatic example or be it 100% as in the prior simplistic example.

Simply stated, super-saturation relates to facilitating out of context placement of content, and this placement is by definition in addition to the saturation of the in context material—regardless of the level of in context materials.

SIM Card: This is a Subscriber Identity Module card that is commonly inserted into a cellular telephone.

Tagging: Tagging relates to an identification that reveals that the tagged visitor is known to have been at a predetermined information media, such as an internet site or a specific internet page, or have dialed up to a specific telephone number, etc. The tag need not contain any information that identifies the visitor nor need it contain any information that allows the visitor to be profiled. A tag simply identifies that its bearer was so marked for having been at a specific location, or for having been there for a predetermined amount of time, or for having conducted some specific action there, etc.

SUMMARY OF THE INVENTION

The present invention relates to a super-saturation method for information-media, whereby a second information-media broadcaster in conjunction with an agency extends a content presentation of a first broadcaster beyond a predetermined information-media saturation threshold for content presentation of the first broadcaster, the method including the steps of:

a) an agency facilitating visitor identification; (note: in the context of the present invention "an agency" is a service facilitator)

b) in conjunction with the agency, a first broadcaster of the first information-media tagging a preponderance of visitors to the first information-media with a tag; and c) in conjunction with the agency, a second broadcaster of a second information-media recognizing a visitor to the second information-media as having the tag, and thereupon by proxy-either in conjunction with the agency or in conjunction with the first broadcaster—the second broadcaster accepting the offsite content presentation for the recognized visitor.

For a combination of financial and pragmatic considerations, it is a *sine qua non* that commercial Web sites and other data communication media, in presenting a variety of core information to viewers, readers or listeners, also insert an amount of non-core special message information. Special messages include advertisements, legal instruments, credit warnings and notifications, to name but a few. These special messages take the form of single directional informative messages or as interactive information directed at specific targeted clients.

It is obviously in the best interest of a proprietor of these media, to place as much and as many special messages into each media presentation as possible, since this is a prime and significant source of revenue. However, there is a natural limitation to the quantity of special messages that may be applied to a data communication media. This limitation, described as saturation, is not itself a technical problem but rather one of financial, aesthetic and pragmatic considerations.

A media may reach this saturation level due to pragmatic considerations such as limited physical size or space. In addition, saturation may occur due to a requirement to limit the cost of a producing a Web site, magazine, newspaper or other media application. In general, providers of core information need to provide a service that has an aesthetic appeal to targeted client viewers, readers or listeners. By insertion of excessive amounts of special messages and consequent over-saturation of a media site, targeted clients will find the sheer volume of data too overwhelming and difficult to maintain interest and to absorb.

In addition, it is financially and from customer relationship point of view, undesirable to turn away clients who are willing to pay for insertion of special messages. In order to limit the amount of added special messages in a data communication media, while still not turning away requests for insertion of special messages, an alternative is needed. This alternative allows the Web site or other media to gain financially and still maintain customer confidence by applying a technique of super-saturation. The present invention provides a solution to this difficulty.

Ordinarily, each media broadcaster has a targeted client base, to which core information is directed. Targeted client bases are related, for example, to income level, profession, age, sex or field of interest, to name a few. In general, special messages are directed to the particular targeted client base of a media broadcaster.

Simply stated, when a media reaches special message saturation, in regard to the present invention, an agency or a second broadcaster is utilized to extend a special message content presentation through the use of a second, alternative information-media broadcaster. A special message, prepared at the direction of an agency by the first saturated media broadcaster are placed into the media of a second broadcaster. This special message presentation is for presentation to substantially the same targeted client base but on an off-site basis at another site servicing substantially the same client base.

To reach this client base, an arrangement is entered into by the first broadcaster in conjunction with the agency, so that substantially all clients visiting the first broadcaster are tagged. This tag is recognized when a tagged visitor requests a visit to the second broadcaster site. Recognition of such a tag gives rise, in conjunction with the agency or in conjunction with the first broadcaster, to a number of possibilities. For example, in an Internet situation, the visitor is presented with the first broadcaster's special message. Alternatively, the visitor is caused to fetch a special message. Similarly, this special message is placed into a cellular Subscriber Identity Module (SIM) card database, and targeted at a client base, appropriate to the first broadcaster. Another possibility is the use a telephone system data base.

The present invention also relates to a contracting structure for facilitating super-saturation of an information-media, whereby a second information-media broadcaster in conjunction with an agency extends a content presentation of a first broadcaster beyond a predetermined information-media saturation threshold for content presentation of the first broadcaster, the contracting structure including:

a) a first contractual agreement between an agency offering an offsite content presentation for a first information-media and a content provider accepting said offering;

i) whereby the agency provides a facilitated delivery of a content of the first content provider to an identified visitor visiting offsite; and ii) whereby the content provider pays for the facilitated delivery;

b) a second contractual agreement between the agency and a first broadcaster of the first information-media;

i) whereby the first broadcaster provides a facilitated tagging of a preponderance of visitors to the first information-media; and ii) whereby the agency provides a facilitated offsite placement of a content deriving from the first contractual agreement, the agency paying the first broadcaster for substantially each such facilitated placement; and c) a third contractual agreement between the agency and a second broadcaster of a second information-media;
  i) whereby the second broadcaster provides a facilitated recognizing of a visitor to the second information-media as having the tag, and thereupon by proxy— either in conjunction with the agency or in conjunction with the first broadcaster the second broadcaster provides a facilitated accepting the offsite content presentation for the recognized visitor; and
  ii) whereby the agency pays for the facilitated delivery accepting.

Simply stated, the basis for this contracting structure is that a first broadcaster has reached a point of special message saturation. Another broadcaster in a second information-media, in conjunction with an agency, extends a special message content presentation on behalf of the first broadcaster. Therefore, the first broadcaster, in effect, reaches a content presentation beyond a predetermined information-media saturation threshold, or a state of super-saturation.

A contracting structure in terms of the present invention, consists of three separate contracts. A first contractual agreement is between an agency offering, for example, to an advertiser or a credit card organization, respectively, an insertion of an advertisement or a credit warning into an offsite media. This offer arises as a result of a first broadcaster being unable to accommodate additional insertions, that is, being at a point of saturation. The agency includes, in terms of this contract, a provision for delivering the inserted item to an identified offsite visitor. The advertiser pays the agent for this service.

A second contract is between the agency and a first broadcaster; in this case, the broadcaster that has reached saturation point, for insertion of additional items. The first broadcaster thus reaches a situation described by the present invention as super-saturation. The broadcaster agrees to provide tagging of substantially all visitors to this first media site. Further, the agency agrees to provide an alternative site for facilitating identified visitors from the first broadcaster site receiving the inserted item on visiting the second site. The agency pays the first broadcaster in terms off this contractual arrangement.

Finally, the agency enters into a third contract with a second broadcaster. In terms of this contract, in conjunction with either the agency or the first broadcaster, the second broadcaster provides a procedure for recognizing a tagged visitor to the second media. This procedure includes the visitor accepting the offsite presentation item. The agency pays the second broadcaster for accepting this item.

In terms of these three contracts, the first broadcaster benefits from selling a placement of an advertisement, a notification or other insertion into an alternative site. In spite of the first broadcaster being at a saturation point, by providing tagging of visitors to this first site, the first broadcaster provides the advertiser with a preponderance of first site visitors. These visitors are able to receive this message item at another appropriate site. The agency pays the second broadcaster for placing insertions on behalf of the advertiser for acceptance by visitors tagged at the first site. The advertiser benefits by having an advertisement, albeit at the second site, nevertheless targeted at visitors to the saturated first broadcaster site. The net proceeds from these contracts, of course, will accrue to the agency, which has acted as a facilitator and coordinator in terms of the contracts for this super-saturation method.

Typically, a web site sales force will sell access to its audience via offsite content because no one knows better than a web site sales force, how to sell to their own audience. An agency will merely act as a facilitator that will charge a percentage or a fee for a transaction for finding the audience elsewhere. A second site where the visitor will be found will rent its unsold space for a fixed fee or for a percentage of the transaction as well.

It should be noted that privacy is a huge issue that is substantially addressed by embodiments of the present invention. The second site need not even know where the audience of the first site is found nor that it is the first site that sold its space as an offsite space. The second site merely rents unsold space for an unknown visitor in return for a fee received from an agency and not the other site. The fact that an advertisement on behalf of site X advertiser is shown to the visitor while he is on site Y is of no consequence. Site X simply sold the space as offsite space to their advertiser. Site X does not know on which web site was their visitor found and they don't care as long as it is not a porn site or another site that belongs to a category that either Site X or their Advertiser is not interested in. Site X reports to its advertiser just that its ad was shown to Site X visitor on another site. In this embodiment none of the parties learns new information about the visitor. Site X and its advertiser do not know at what web site was Site X visitor found. The site where the Site X visitor is found does not know that it is a Site X visitor, just that an unsold space of its was sold by another anonymous site and that in return for renting its own space to the other anonymous site it is receiving from the agency a fee.

BRIEF DESCRIPTION OF THE FIGURES

In order to understand the invention and to see how it may be carried out in practice, embodiments will now be described, by way of non-limiting example only, with reference to the accompanying drawings, in which.

DETAILED DESCRIPTION OF THE INVENTION

At the present, there is a vast flow of information. This occurs as a result of the growth and development of a number of data communication media. Although this has made information available literally at the press of a button, the limit of human capacity is becoming apparent.

An additional problem has also become apparent with the growth of the Internet and other data communication systems. Communication media are also used for another purpose, in parallel with transmitting core information, using data communication media. This purpose is the transmission of special messages alongside core information. Special messages include advertisements, notifications, legal notices, credit warnings and a host of other items. These messages are both single directional and interactive between sender and targeted recipients.

Typically, in Internet Web sites, it has become commonplace to have a variety of special messages. These include advertisements with or without hyper-linking to other Web sites or other Web pages, warnings, legal notices and credit control notices and a host of others. Similarly, cellular telephones SIM cards carry text and audio special messages. In addition, credit card databases carry credit warning messages and telephone system databases carry audio and text messages and warnings. In much the same way, magazines and newspapers carry special text and graphic messages in the form of advertisements, legal notices and so on.

The amount and proportion of such special messages that can be carried in a media site is limited by aesthetic, physical and financial considerations. These considerations may be expressed as the ratio of the amount of non-core special message information to the quantity of core information. When the proportion of non-core information reaches a point of unacceptability to a viewer, listener or reader, this point is termed saturation.

This saturation is financially limiting to media. Many methods are used to extend this saturation point, for example, by using hyperlinks on a Web site, by adding supplements to newspapers or magazines, by adding special message supplements to credit card billing and many others. These techniques merely appear to delay the onset of saturation but are often ineffective.

In some situations, for financial considerations, it is impractical to extend the physical size of media sites. Therefore, a magazine may be limited to a specific number of pages and a Web site to a specific number of Web pages.

Equally, aesthetics of any media site have to be taken into consideration. Readers, listeners or viewers must not overwhelmed with the multiplicity and density of information represented by over-saturation. This makes a media appear unfriendly and overwhelming. There is, then, a need for a method to reach beyond this point of saturation in a media without creating over-saturation.

Figure 1:
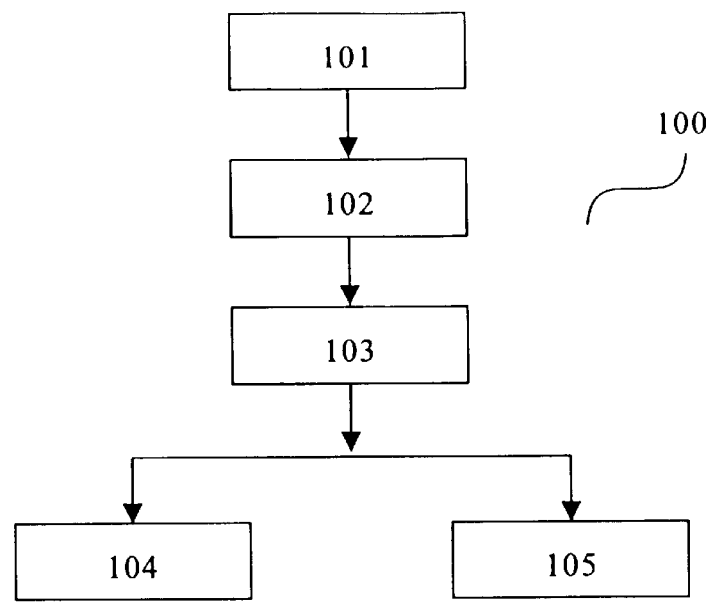
FIG. 1 illustrates a schematic view of a super-saturation method for information-media.

Turning to FIG. 1, illustrating a schematic view 100 of the steps of a super-saturation method for information-media.

The present invention relates to a super-saturation method for information-media, whereby a second information-media broadcaster in conjunction with an agency extends a content presentation of a first broadcaster beyond a predetermined information-media saturation threshold for content presentation of the first broadcaster, the method including the steps of:

a) an agency facilitating 101 visitor identification; (note: in the context of the present invention "an agency" is a service facilitator)an agency b) in conjunction with the agency, a first broadcaster of the first information-media tagging 102 a preponderance of visitors to the first information-media with a tag; and c) in conjunction with the agency, a second broadcaster of a second information-media recognizing 103 a visitor to the second information-media as having the tag, and thereupon by proxy-either in conjunction with the agency 104 or in conjunction with the first broadcaster 105—the second broadcaster accepting the offsite content presentation for the recognized visitor.

It is a sine qua non that commercial Web sites and other data communication media sites, while presenting core information to specifically targeted viewers, readers or listeners, also insert as much non-core special message information as possible. After all, this is a major revenue source for a site. In addition, non-core special messages are directed at these same specifically targeted viewers, readers or listeners. A targeted group is generally defined as market related to such aspects as age, technical field, sex, profession and many others.

At a commercial site with substantive visitor traffic, there is a demand for space for special message items such as advertisements, notices and so on. If the media site arrives at a point of reaching a predetermined quantum of special message items, that is, reaches a point of saturation, clients requiring additional space for further special messages cannot be satisfied. By insertion of excessive amounts of special messages and consequent over-saturation of a media site, targeted clients will find the sheer volume of data too overwhelming and difficult to maintain interest and to absorb.

It is obviously in the best interest of a proprietor of these media, to place is much and as many special messages into each media presentation as possible, since this is a prime and significant source of revenue. Similarly, clients wishing to place special message items, have a vested interest insofar as directing, for example, advertisements for products or services, to the specifically targeted visitors to this site.

Simply stated, when a media reaches special message saturation, in regard to the present invention, an agency, in conjunction with a suitable second broadcaster, is utilized to extend additional special message content presentation beyond saturation point. The second broadcaster site is selected specifically because this site targets a category of visitors similar to the first broadcaster site. A special message item, prepared, for example, by a client advertiser at the direction of the agency, is placed into the second broadcaster site. This special message presentation is for presentation to substantially the same targeted client base but on an off-site basis at an alternative site servicing substantially the same client base.

To reach this client base, an arrangement is entered into by the first broadcaster in conjunction with the agency. Substantially all clients visiting the first broadcaster are tagged at the instance of this broadcaster. For example, a cookie is inserted into a visitor's browser or similar tags are placed into a customer database.

Recognition of this tag occurs, in accordance with an arrangement between an agency and both first and second broadcasters, when a tagged visitor requests a visit to the second broadcaster site. Recognition of such a tag gives rise, in conjunction with the agency or in conjunction with the first broadcaster, to several possibilities. For example, in an Internet situation, a recognized visitor is presented with the first broadcaster's special message, situated in the second broadcaster. Alternatively, the visitor fetches a special message from the second broadcaster. Similarly, this special message is placed into a cellular SIM card database, targeted at a client base appropriate to the first broadcaster. Another possibility is the use a telephone system database to elicit a similar result.

The net consequence of using the method of the present invention is that all parties to this method are satisfied. The client advertiser has exposure to a targeted visitor group. The first broadcaster, in spite of being saturated with inserted message items, is able to reach a situation of super-saturation and, consequently, benefit financially. The second broadcaster receives additional revenue with the addition of special message items. Finally, the agency benefits as a result of this application of the present invention, in a role as facilitator and coordinator.

Turning now to FIGS. 2, 3, 4, 5, 6 and 7, these illustrate schematically aspects of a contracting structure for facilitating super-saturation of an information-media.

Figure 2:
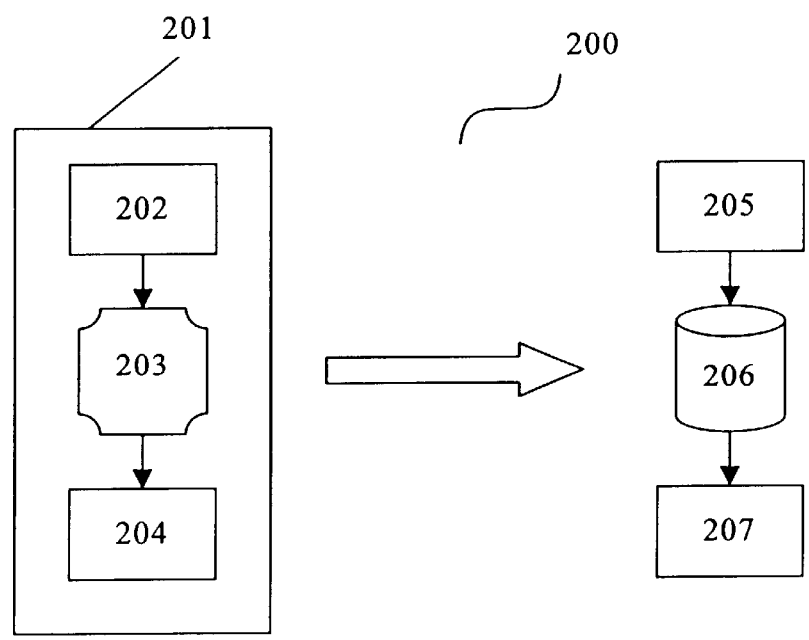
FIG. 2 illustrates a schematic view of a first contractual agreement.

FIG. 2 illustrates a schematic view 200 of a first contractual agreement 201.

Figure 3:
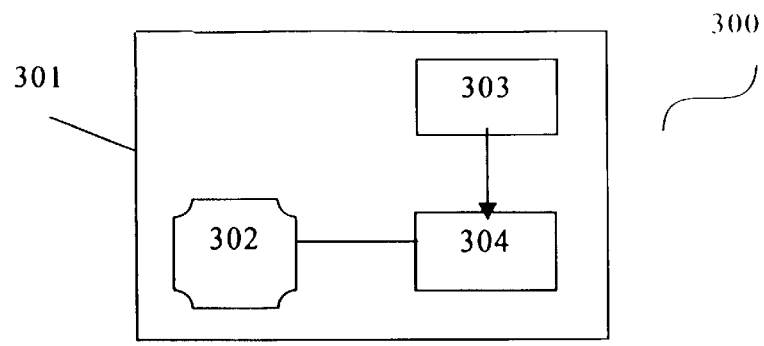
FIG. 3 illustrates a schematic view of a second contractual arrangement.

FIG. 3 illustrates a schematic view 300 of a second contractual arrangement 301.

Figure 4:
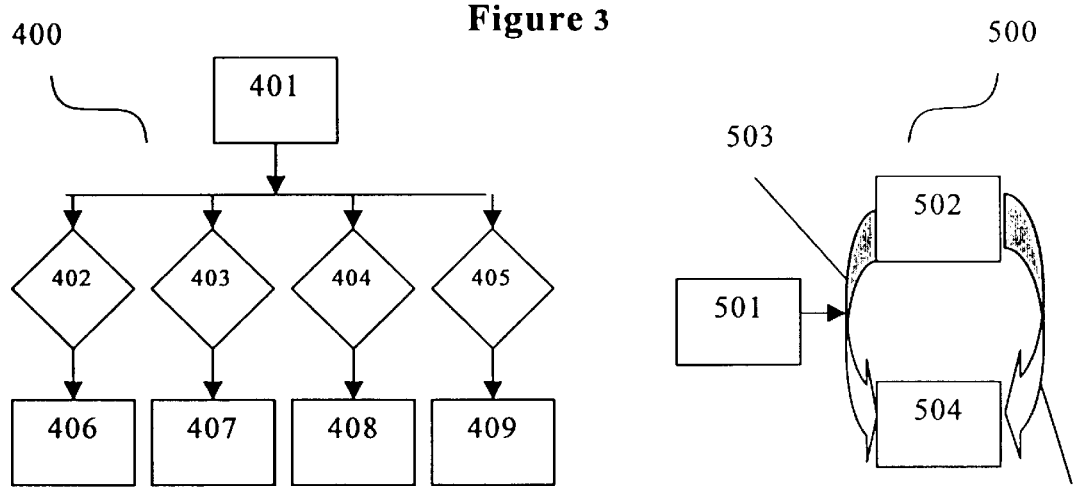
FIG. 4 illustrates a schematic view relating to a first broadcaster providing a facilitated tagging of a preponderance of visitors to the first information-media.

FIG. 4 illustrates a schematic view 400 relating to a first broadcaster providing 401 a facilitated tagging 402, 403, 404 and 405 of a preponderance of visitors 406, 407, 408 and 409 to the first information-media.

Figure 5:
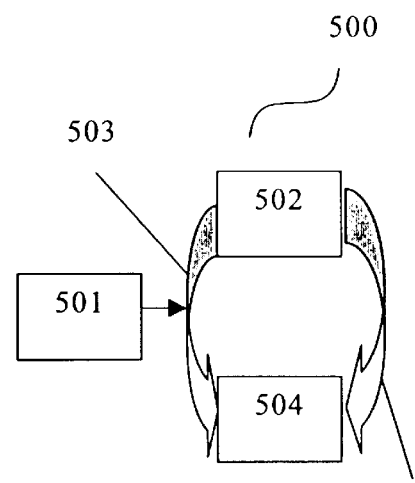
FIG. 5 illustrates a schematic view relating to an agency 502 providing a facilitated offsite placement of a content deriving from the first contractual agreement, the agency paying the first broadcaster.

FIG. 5 illustrates a schematic view 500 relating to an agency 502 providing 503 a facilitated offsite placement 501 of a content deriving from the first contractual agreement, the agency paying 505 the first broadcaster 504

Figure 6:
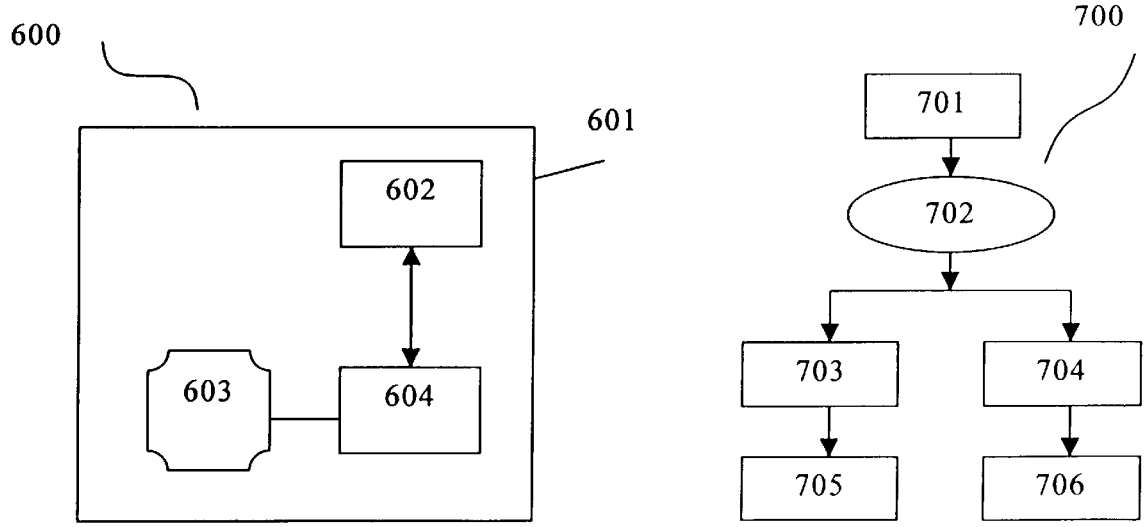
FIG. 6 illustrates a schematic view relating to a third contractual agreement.

FIG. 6 illustrates a schematic view 600 relating to a third contractual agreement 601.

Figure 7:
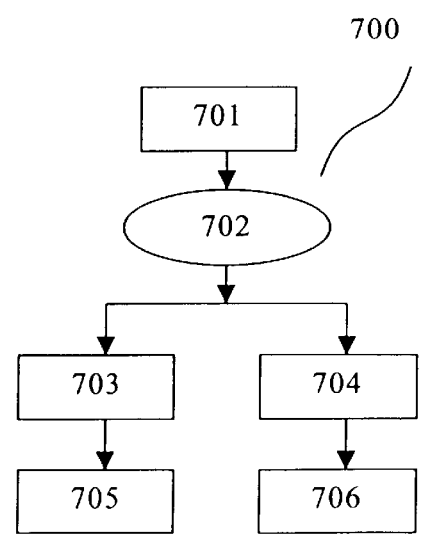
FIG. 7 illustrates a schematic view relating to details of the third contractual agreement.

Finally FIG. 7 illustrates a schematic view 700 relating to details of this third contractual agreement.

The present invention also relates to a contracting structure for facilitating super-saturation of an information-media, whereby a second information-media broadcaster in conjunction with an agency extends a content presentation of a first broadcaster beyond a predetermined information-media saturation threshold for content presentation of the first broadcaster, the contracting structure including:

a) a first contractual agreement 201 between an agency offering 202 an offsite content presentation 203 for a first information-media and a content provider accepting 204 said offering;
  i) whereby the agency provides a facilitated delivery 205 of a content 206 of the first content provider to an identified visitor visiting 207 offsite; and
  ii) whereby the content provider pays for the facilitated delivery;

b) a second contractual agreement 301 between the agency 303 and a first broadcaster 304 of the first information-media 302;
  i) whereby the first broadcaster 401 provides a facilitated tagging 402, 403, 404 and 405 of a preponderance of visitors 406, 407, 408 and 409 to the first information-media; and
  ii) whereby the agency 502 provides 503 a facilitated offsite placement 501 of a content deriving from the first contractual agreement, the agency paying 505 the first broadcaster 504 for substantially each such facilitated placement; and c) a third contractual agreement 601 between the agency 602 and a second broadcaster 604 of a second information-media 603;
  i) whereby the second broadcaster provides 701 a facilitated recognizing 702 of a visitor to the second information-media as having the tag, and thereupon by proxy—either in conjunction with the agency 703 or in conjunction with the first broadcaster 704—the second broadcaster provides a facilitated accepting 705 and 706 the offsite content presentation for the recognized visitor; and
  ii) whereby the agency pays for the facilitated delivery accepting.

Simply stated, the basis for this contracting structure is that a first broadcaster has reached a point of special message saturation. Another broadcaster in a second information-media, in conjunction with an agency, extends a special message content presentation on behalf of the first broadcaster. Therefore, the first broadcaster, in effect, reaches a content presentation beyond a predetermined information-media saturation threshold, or a state of super-saturation.

According to an embodiment of the present invention, a contracting structure consists of three separate contracts. A first contractual agreement is between an agency offering, for example, to an advertiser or a credit card organization, respectively, an insertion of an advertisement or a credit warning into an offsite media. This offer arises as a result of a first broadcaster being unable to accommodate additional insertions, that is, being at a point of saturation. The agency includes, in terms of this contract, a provision for delivering the inserted item to an identified offsite visitor. The advertiser pays the agent for this service. Furthermore, it is also conceivable that the first broadcaster is the content provider.

A second contract is between the agency and a first broadcaster; in this case, the broadcaster that has reached saturation point, for insertion of additional items. The first broadcaster thus reaches a situation described by the present invention as super-saturation. The broadcaster agrees to provide tagging of substantially all visitors to this first media site. Further, the agency agrees to provide an alternative site for facilitating identified visitors from the first broadcaster site receiving the inserted item on visiting the second site. The agency pays the first broadcaster in terms off this contractual arrangement.

Finally, the agency enters into a third contract with a second broadcaster. In terms of this contract, in conjunction with either the agency or the first broadcaster, the second broadcaster provides a procedure for recognizing a tagged visitor to the second media. This procedure includes the visitor accepting the offsite presentation item. The agency pays the second broadcaster for accepting this item.

In terms of these three contracts, the first broadcaster benefits from selling a placement of an advertisement, a notification or other insertion into an alternative site. In spite of the first broadcaster being at a saturation point, by providing tagging to visitors to this first site, the first broadcaster provides the advertiser with a preponderance of first site visitors. These visitors are able to receive this message item at another appropriate site. The agency pays the second broadcaster for placing insertions on behalf of the other site (or the advertiser) for acceptance by visitors tagged at the first site. The advertiser benefits by having an advertisement, albeit at the second site, nevertheless targeted at visitors to the saturated first broadcaster site. The net proceeds from these contracts, of course, will accrue to the agency, which has acted as a facilitator and coordinator in terms of the contracts for this super-saturation method.

As will be understood by a man of the art, the terminology in relation to Internet Web Site usage, of the phrase "Cost Per Thousand" (CPM) is used by Internet marketers to price advertising banners. Sites that sell advertising will guarantee an advertiser a certain number of impressions (number of times an advertising banner is downloaded and presumably seen by visitors.), then set a rate based on that guarantee times the CPM rate. A Web site that has a CPM rate of $25 and guarantees advertisers 600,000 impressions will charge $15,000 ($25×600) for those advertisers' advertising banner.

By way of an example of the embodiments of the present invention, in a case of a 'highly-valued' section (i.e. Financial section) of a particular site, advertisements sell for $50 CPM. Advertisement space in this section is often sold out. However, another section of that site devoted to General News sells for only $10 CPM and is usually unsold. If a user browses the Financial section and then goes to the General News section, the user will be recognized by the agency as a Financial section visitor, 'interested in Finance'. Because advertisers are willing to pay a premium to reach the 'interested in finance' person, portions of the inventory in the General News section may now be sold by the site for $35 instead of for the traditional $10.

A further example relating to the embodiments of the present invention wherein a publisher sells visitors to its lucrative/sold-out site sections to its advertisers but on other web sites, as yet not sold-out. The as yet not-sold-out web sites rent their substantially unsold space to be sold by publishers to their own advertisers through an agency. For example, assuming that a publisher's Personal Finance section is sold out at $50 CPM. Visitors to this section will inevitably visit other content sites. The publisher's sales force, which already has the expertise to sell to the Personal Finance section audience, can now sell these Personal Finance section visitors to its own advertisers for $30 when those visitors surf other sites, thus providing the Publisher with a new revenue stream.

In this next example, a publisher's unsold space is sold by other publishers as offsite space to their own advertisers. A technology related publisher, for example, may charge $60 CPM for advertising on its web site. However, the technology related publisher could charge its advertisers $45 CPM in return for showing offsite advertisements to the publisher's regular site audience. More simply stated, the technology related publisher will charge its advertisers $45 CPM in return for showing advertisements to its site audience while they visit other web sites.

The publisher, which in its unsold space the technology related publisher audience was found, call charge through the agency, a fixed CPM or take a percentage of the revenues from the technology related publisher that used its advertising space to serve offsite advertisements to its own audience on behalf of its advertisers.

Following these examples it is emphasized that as a publisher an important target is earn a new revenue stream without cannibalizing current revenues or devaluing currently selling advertising. Selling offsite advertisements is a significant improvement to the art. For example, selling a bundle of 10 exposures to advertisements within a site for $45 CPM and 100 exposures offsite for a $30 CPM, represents a significant revenue source.

According to an embodiment of the present invention, the super-saturation method for information-media, the agency is an advertising agency.

In this capacity, an agency provides know-how and experience in advertising and in marketing of advertising media in a variety of fields such as the Internet, radio, television and news media.According to another embodiment of the present invention, the super-saturation method for information-media, the agency is a credit agency.

An important aspect of commerce includes controlling and regulating credit facilities. A credit agency is in a position to assist clients requiring to regulate customer credit lines. This can be accomplished in accordance with the present invention by utilizing notifications into a variety of media, such as telephone and cellular telephone databases.

According to an additional embodiment of the present invention, the super-saturation method for information-media, the agency is a public service organization.

Public service organizations are often called on to assist members of the public in a large range of problems. These include, for example, finding a lost pet, tracing missing persons, assisting old-age pensioners and so on. Placing notifications in available media is pertinent to resolving such problems.

According to a further embodiment of the present invention, the super-saturation method for information-media, the agency is a legally empowered body.

A multiplicity of legal matters form part of today's relationships with bodies such as banks, home loan institutions, adoption agencies and many others. Inevitably, legal matters include placing of various notices including notices of advisement, warning, information and a host of others. Access to all media is an important aspect for any legally empowered body.

According to an alternative embodiment of the present invention, the super-saturation method for information-media, the agency is a media agency.

A media agency has a distinct advantage in dealing with not merely a multiplicity of media, but also advertisers, core information providers, and others. This is important in promoting relationships between advertisers, a substantial array of broadcasters, and other participants in relation to the present invention.

According to one other embodiment of the present invention, the super-saturation method for information-media, the agency is a cellular telephone service.

According to another embodiment of the present invention, the super-saturation method for information-media, the agency is a wireless communication service.

Agencies, in order to be able to form a liaison between advertisers and media broadcasters, need to have a working knowledge of the field of interest. Clearly, enterprises offering cellular telephone services and wireless communication services are able to provide access to a database of customers as well as access to related telephone and other communication media.

According to an added embodiment of the present invention, the super-saturation method for information-media, offering includes selling.

According to an additional embodiment of the present invention, the super-saturation method for information-media, offering includes renting.

According to a further embodiment of the present invention, the super-saturation method for information-media, offering includes leasing.

According to an alternative embodiment of the present invention, the super-saturation method for information-media, offering includes trading.

According to one other embodiment of the present invention, the super-saturation method for information-media, offering includes proposing for payment.

When an agency becomes aware of a saturation situation at a media broadcaster, the agency makes proposals to prospective advertisers, notification organizations and others with regard to arranging media space. These special message insertions into appropriate media, related to a saturated media site, are negotiated from an offering, selling, renting and selling perspective. Included in this negotiation as part of offering are also trading between media sites and arrangements regarding payment.

According to an added embodiment of the present invention, the super-saturation method for information-media, the offsite content presentation is an advertisement presentation.

Advertisements are commercially important in promoting products and services. Insertion of successful advertisements is ideally made into media sites where core information or personnel are generally involved in related fields.

There are many instances, however, where this is not necessary, for example, advertisements for insurance, restaurants, entertainment, etc. have a very general appeal. Therefore, offsite presentations can be made effective by judicious site selection.

For example, people involved with finance and business generally read a financial section of a newspaper. Therefore, a luxury car advertisement is logically shown in that section. If, however, the financial section reader is identified while reading the general news section, the luxury car advertisement is shown to him again.

According to another embodiment of the present invention, the super-saturation method for information-media, the offsite content presentation is a notification.

Notifications generally relate to personnel or core information on a site. Therefore notifications regarding a lost pet, dog licensing requirements, etc. are appropriate to, for example, a magazine dealing with animals, dos and cats, and so on. Notifications of expiry of a media service are ideally made on a service offering the media service such as a cellular or wireless network.

According to a variation of an embodiment of the present invention, the super-saturation method for information-media, the notification is a public service announcement.

An example of this type of notification is using a particular regional telephone exchange to advise of some change in municipal services such as refuse removal, power cuts and water system repairs.

According to another variation of an embodiment of the present invention, the super-saturation method for information-media, the notification is a personal reminder.

The local telephone service and more recently, cellular telephone services have provided personal reminder notifications of many types. For example, wake-up calls, appointment reminders, etc.

According to a further variation of an embodiment of the present invention, the super-saturation method for information-media, the notification is a judicial instrument.

According to an additional variation of an embodiment of the present invention, the super-saturation method for information-media, the notification is a credit warning.

Notifications cover an enormous selection of devises. Examples of these relate to bankruptcy, missing persons, meeting times, excessive spending on a credit card account, marriage, divorce, to name just a few.

According to an added embodiment of the present invention, the super-saturation method for information-media, the offsite content presentation is a graphic item.

Graphic presentations are used in many information-media due to the eye-appeal to the reader and viewer. Examples of graphic presentations, in the context of the present invention, include news photographs, graphical advertising presentations, promotional items, catalogues, cartoons and many more According to another embodiment of the present invention, the super-saturation method for information-media, the offsite content presentation is a multimedia presentation.

According to a further embodiment of the present invention, the super-saturation method for information-media, the offsite content presentation is an audio presentation.

According to one other embodiment of the present invention, the super-saturation method for information-media, the offsite content presentation is a banner.

Offsite presentations are not limited to merely text or graphic visual effects but include multimedia, audio and banner presentations. These are made up of movie clips, video productions and banners, either as stationary items or as moving presentations.

According to a supplementary embodiment of the present invention, the super-saturation method for information-media, the first information-media is an Internet data communications media.

The Internet represents, in many respects, a rapidly growing communication media accessed by very large numbers of people. Internet sites vary in accordance with core information so that advertisements and any other notifications can be directed at very specific targeted groups of people. Substantially all aspects of the present invention relate well to use in this media, but, are not, by any means, restricted to it.

According to another variation of an embodiment of the present invention, the super-saturation method for information-media, the Internet data communications media includes at least one content presentation of a plurality of content presentations.

An implication of this embodiment relates to a concept that offsite presentations are not necessarily limited to a single presentation, nor to a presentation being limited to a single site or even to a single media.

According to an added embodiment of the present invention, the super-saturation method for information-media, the first information-media is an interactive data communications media.

According to an additional variation of an embodiment of the present invention, the super-saturation method for information-media, the interactive data communication media is a telephone communication media.

According to a further variation of an embodiment of the present invention, the super-saturation method for information-media, the interactive data communication media is a wireless communication media.

According to another variation of an embodiment of the present invention, the super-saturation method for information, the interactive data communication media is a cellular communication media.

In the past, advertising and placing of notices was a one-way information transference. An interesting development in the use of Internet advertising and notification techniques is the extent of possible interactivity. This is certainly also the case in many other media such as cellular, wireless and telephone media. By being easily and readily interactive, these media provide users with the possibility of quick responses to notifications.

According to an added embodiment of the present invention, the super-saturation method for information-media, the first information-media is a broadcasting media.

Radio and television broadcasting are the oldest of the electronic communication media. These have been used both by core information presenters and advertisers, to present information to selected groups of people. This is especially true with regard to program material targeting specific population groupings based on selection techniques such as time of presentation.

According to a further embodiment of the present invention, the super-saturation method for information-media, the first information-media is a hyperlink.

Hyperlinks are a very useful way to convey offsite notifications to targeted visitors. Hyperlinks are commonly used for placing advertising links to source presenters. This is achieved also by a broadcaster using a hyperlink to send a presentation item to a visitor's browser or to cause a visitor to fetch the presentation.

According to an alternative embodiment of the present invention, the super-saturation method for information-media, the first information-media is a banner.

Banners are commonly used in a wide selection of media, including magazines, newspapers, bills, internet sites and others. These are usually brief and are an ideal media for drawing attention to other media, other advertisers and so on. Banners are also used for presenting hyperlinks and as a separate media presentation for notices of many types. Banners are used in virtually every communication media and supply a convenient brief communication media. Banners take a form such as headers in a newspaper and magazines, announcements in cellular voice mail systems, presentations in Internet sites, and so on.

According to an additional embodiment of the present invention, the super-saturation method for information-media, the first broadcaster has an association with an interactive data communication media.

According to another embodiment of the present invention, the super-saturation method for information-media, the first broadcaster is a Web site on an Internet data communication media.

Sites in this scenario relate to, for example, dissemination of information, news, scientific data, entertainment and many others. Use of added insertions of advertising and notifications includes examples such as insurance promotion, banking, personal notices, product availability, and legal advisements, to name but a few.

According to an added embodiment of the present invention, the super-saturation method for information-media, the first broadcaster is an advertising media.

There are already many Web sites relating exclusively to product and service promotion. These are not necessarily limited to a single product or service, or even a single range of products or services. In many cases, a range of goods and services is quite general. In some cases, broadcasters that are essentially advertising media, use appropriate core presentations as a base for advertising presentations.

According to an embodiment of the present invention, the super-saturation method for information-media, the first broadcaster is a credit agency.

These sites relate to placing warning messages and informative notices relating to creditworthiness and to financial status of a range of commercial enterprises and individuals.

According to an embodiment of the present invention, the super-saturation method for information-media, the first broadcaster is a credit control agency for a credit card organization.

Such a broadcaster, in the current embodiment context, will make use of a credit card organization database to direct notices to credit card users as well as to suppliers accepting payment by credit card. These notices generally relate, on the one hand to warnings regarding overspending or underpayment by card users, and, on the other hand, warning to suppliers. However, additional uses include promotional additions to billing documents and to information brochures.

According to an embodiment of the present invention, the super-saturation method for information-media, the first broadcaster is a banner promotion agency.

According to an embodiment of the present invention, the super-saturation method for information-media, the first broadcaster is a public service organization.

Public service organizations provide a wide range of services, for example, to the elderly and infirm, to children, to unmarried mothers, financial and charity, and many others. Many such organizations publish web sites, magazines, newsletters and so on. Many include advertisements and a host of other notices.

According to an embodiment of the present invention, the super-saturation method for information-media, the first broadcaster is a legally empowered body.

A classic example of such a body is the revenue service although there are others such as the Society for the Protection of Animals, child protection agencies, pension and social benefit bodies, to name a few.

According to an embodiment of the present invention, the super-saturation method for information-media, the first broadcaster is a media agency.

According to an embodiment of the present invention, the super-saturation method for information-media, the first broadcaster is a cellular telephone service provider.

According to an embodiment of the present invention, the super-saturation method for information-media, the first broadcaster is a wireless communication media.

All the aforementioned media are able to utilize the present invention for promotional, advertising and notification to their customer base. This represents a large number of individuals and enterprises, which can be grouped into targeted databases. Advertising and notification messages are then sent to specifically targeted groups.

According to an embodiment of the present invention, the super-saturation method for information-media, the first broadcaster is a hyperlink.

A hyperlink provides a route for easy access to anywhere on the World Wide Web. Apart from a particular link, access is available to specific sites and to specific groups of sites having similar core information or similar areas of interest, for example, a group of sites relating to philately, dog breeding, hunting, and medicine, to name a few.

According to an embodiment of the present invention, the super-saturation method for information-media, tagging a preponderance of visitors includes placing a cookie into each visitor of the preponderance of visitors.

According to a variation of an embodiment of the present invention, the super-saturation method for information-media, in which placing a cookie into each visitor of the preponderance of visitors includes placing an identification message into each visitor's web browser when the visitor requests a page.

A cookie is a message given to a Web browser by a Web server. The browser stores the message in a special text file. This message is sent back to the server each time the browser requests a page from the server. This cookie then provides an identification of the visitor.

According to an embodiment of the present invention, the super-saturation method for information-media, tagging a preponderance of visitors includes placing a notification into a telephone system database for each visitor of the preponderance of visitors.

According to an embodiment of the present invention, the super-saturation method for information-media, tagging a preponderance of visitors includes placing a message identifier record into a database for each of the preponderance of visitors.

In these instances, effectively, a result similar to using a cookie is achieved. However, instead of using the Web, a media database is utilized.

According to an embodiment of the present invention, the super-saturation method for information-media, tagging a preponderance of visitors includes placing a credit warning into a creditcard database for each visitor of the preponderance of visitors.

Notifying credit card users of overspending and underpayments are often used warnings. Notices are appended to credit card billing, sent to cardholders via merchants at the time of a transaction, and so on. Notices are also of an informative and promotional nature to encourage additional card use.

According to an embodiment of the present invention, the super-saturation method for information-media, tagging a preponderance of visitors includes placing a personal notice into a public service database for each visitor of the preponderance of visitors.

Notices for lost and found items, personal matters and many others are not uncommon uses for this media. Searching for long-lost relatives is another example. These are, naturally, conveyed to people to whom such notices are pertinent.

According to an embodiment of the present invention, the super-saturation method for information-media, tagging a preponderance of visitors includes sending a legal instrument into a legally empowered body database for each visitor of the preponderance of visitors.

The database at such legally empowered body databases enable authorized personnel to trace failure to submit tax returns, failure to pay family maintenance, non-payment of traffic violation fines, and many others.

According to an embodiment of the present invention, the super-saturation method for information-media, tagging a preponderance of visitors includes placing a message into a cellular telephone SIM card for each visitor of the preponderance of visitors.

According to an embodiment of the present invention, the super-saturation method for information-media, tagging a preponderance of visitors includes placing a notification into a wireless communication service database for each visitor of the preponderance of visitors.

These databases are useful predominantly to the enterprise owning the database. However, these are also commonly used for advertising notices, product and service promotions, etc.

According to an embodiment of the present invention, the super-saturation method for information-media, each visitor of the preponderance of visitors to the first information-media is classified as a preferred visitor.

According to a variation of an embodiment of the present invention, the super-saturation method for information-media, wherein the preferred visitor includes each visitor of the preponderance of visitors classified as a preferred visitor remaining at the first information-media for a predetermined period of time.

According to a variation of an embodiment of the present invention, the super-saturation method for information-media, wherein each visitor of the preponderance of visitors classified as a preferred visitor includes a visitor spending a predetermined amount of money at the first information-media.

In order to reach substantially the same targeted group of visitors at a second site, a tag is placed into specific visitors to the first site. Visitors are evaluated, according to particular criteria, and only those evaluated as preferred and are tagged. Generally, these criteria relate to time spent at the first site and to money spent. However, other criteria can be set such as, for example, replies to special questionnaires, responses to specific details, reaction to predetermined aspects of the first site etc.

According to an embodiment of the present invention, the super-saturation method for information-media, the tag is a cookie.

According to an embodiment of the present invention the super-saturation method for information-media, the tag is an identification message.

According to an embodiment of the present invention, the super-saturation method for information-media, the tag is a notification in a telephone system database.

According to an embodiment of the present invention, the super-saturation method for information-media, the tag is a message identifier record in a database.

According to an embodiment of the present invention, the super-saturation method for information-media, the tag is a credit warning in a credit card database.

According to an embodiment of the present invention, the super-saturation method for information-media, the tag is a personal notice in a public service database.

According to an embodiment of the present invention, the super-saturation method for information-media, the tag is a legal instrument in a legally empowered body database.

According to an embodiment of the present invention, the super-saturation method for information-media, the tag is a message in a cellular telephone SIM card.

According to an embodiment of the present invention, the super-saturation method for information-media, the tag is a notification into a wireless communication service database.

Generally, tags and the process of tagging have mutatis mutandis, been described heretofore in relation to tagging.

According to an embodiment of the present invention, the super-saturation method for information-media, the second broadcaster has an association with an interactive data communication media.

According to an embodiment of the present invention, the super-saturation method for information-media, the second broadcaster is a Web site on an Internet data communication media.

According to an embodiment of the present invention, the super-saturation method for information-media, the second broadcaster is an advertising media.

According to an embodiment of the present invention, the super-saturation method for information-media, the second broadcaster is a credit agency.

According to an embodiment of the present invention, the super-saturation method for information-media, the second broadcaster is a credit control agency for a credit card organization.

According to an embodiment of the present invention, the super-saturation method for information-media, the second broadcaster is a banner promotion agency.

According to an embodiment of the present invention, the super-saturation method for information-media, the second broadcaster is a public service organization.

According to an embodiment of the present invention, the super-saturation method for information-media, the second broadcaster is a legally empowered body.

According to an embodiment of the present invention, the super-saturation method for information-media, the second broadcaster is a media agency.

According to an embodiment of the present invention, the super-saturation method for information-media, the second broadcaster is a cellular telephone service provider.

According to an embodiment of the present invention, the super-saturation method for information-media, the second broadcaster is a wireless communication media.

According to an embodiment of the present invention, the super-saturation method for information-media, the second broadcaster is a hyperlink.

With respect to the second broadcaster, comments already made in regard to the first broadcaster are mutatis mutandis equally applicable here, given regard to the fact that both broadcaster can operate on the same or on different media.

According to an embodiment of the present invention, the super-saturation method for information-media, in which in conjunction with the agency the second broadcaster accepting the offsite content presentation, includes receiving an advertisement presentation.

This offsite presentation relates to, for example, an advertisement presentation, a notification, a warning, a judicial notice and so on. This presentation would have been found in the first broadcaster site but for the first broadcaster having reached a point of saturation. The present invention provides a method for visitors to the first site, to receive these presentations at another site. This is achieved as a consequence of an agency coordinating tagging of visitors by the first broadcaster and coordinating with the second broadcaster recognizing each tagged visitor.

According to an embodiment of the present invention, the super-saturation method for information-media, in which in conjunction with the agency the second broadcaster accepting the offsite content presentation, includes receiving a public service announcement.

According to an embodiment of the present invention, the super-saturation method for information-media, in which in conjunction with the agency the second broadcaster accepting the offsite content presentation, includes receiving a personal reminder.

According to an embodiment of the present invention, the super-saturation method for information-media, in which in conjunction with the agency the second broadcaster accepting the offsite content presentation includes receiving judicial instrument.

According to an embodiment of the present invention, the super-saturation method for information-media, in which in conjunction with the agency the second broadcaster accepting the offsite content presentation includes receiving a credit warning.

According to an embodiment of the present invention, the super-saturation method for information-media, in which in conjunction with the agency the second broadcaster accepting the offsite content presentation includes receiving a graphic item.

According to an embodiment of the present invention, the super-saturation method for information-media, in which in conjunction with the agency the second broadcaster accepting the offsite content presentation includes receiving a multimedia presentation.

According to an embodiment of the present invention, the super-saturation method for information-media, in which in conjunction with the agency the second broadcaster accepting the offsite content presentation includes receiving an audio presentation.

According to an embodiment of the present invention, the super-saturation method for information-media, in which in conjunction with the agency the second broadcaster accepting the offsite content presentation includes receiving a banner.

In the accepting the offsite presentation, it is implicit that the second broadcaster is providing tagged visitors, from the first site, with access to presentations which otherwise would have appeared in the first broadcaster. The reason for the second broadcaster providing this service relates primarily to a state of saturation in the first broadcaster. This relationship between first and second broadcaster is facilitated by an agency that has an association with both broadcasters, and, particularly to the needs of advertisers in the first broadcaster. It is this knowledge that allows the agency to provide a suitable second broadcaster with a similar targeted customer base to the first broadcaster. It is this that makes offsite promotional and advisory notices in a second broadcaster, of interest to both first broadcaster and to advertisers.

According to an embodiment of the present invention, the super-saturation method for information-media, in which in conjunction with the agency the second broadcaster accepting the offsite content presentation for the recognized visitor includes the second broadcaster dropping the offsite content presentation into a browser of the visitor.

According to an embodiment of the present invention, the super-saturation method for information-media, in which in conjunction with the agency the second broadcaster accepting the offsite content presentation for the recognized visitor includes the second broadcaster sending a browser of the visitor to fetch the offsite content presentation.

Both dropping the offsite presentation into a visitor as well as sending the visitor to fetch offsite presentation are techniques usable by browsers in relation to the Internet. Similar procedures are possible in most other media. For example, insertion of appropriate data into a cellular telephone SIM card will advise a user regarding some presentation and equally will advise the user to proceed to some other media to fetch this information. Similar applications are feasible in regard to credit card users to mention just a few.

According to an embodiment of the present invention, the super-saturation method for information-media, in which in conjunction with the agency the second broadcaster accepting the offsite content presentation for the recognized visitor includes the second broadcaster sending the offsite content presentation to the recognized visitor via the second information-media.

Generally substantially all comments and descriptions regarding interaction between an agency and the second broadcaster, apply mutatis mutandis to interaction of the first broadcaster in conjunction with the second broadcaster. However, negotiations between these broadcasters are made directly without the liaison assistance of an agency.

According to an embodiment of the present invention, the super-saturation method for information-media, in which in conjunction with the first broadcaster the second broadcaster accepting the offsite content presentation, includes receiving an advertisement presentation.

According to an embodiment of the present invention, the super-saturation method for information-media, in which in conjunction with the first broadcaster the second broadcaster accepting the offsite content presentation, includes receiving a public service announcement.

According to an embodiment of the present invention, the super-saturation method for information-media, in which in conjunction with the first broadcaster the second broadcaster accepting the offsite content presentation, includes receiving a personal reminder.

According to an embodiment of the present invention, the super-saturation method for information-media, in which in conjunction with the first broadcaster the second broadcaster accepting the offsite content presentation includes receiving judicial instrument.

According to an embodiment of the present invention, the super-saturation method for information-media, in which in conjunction with the first broadcaster the second broadcaster accepting the offsite content presentation includes receiving a credit warning.

According to an embodiment of the present invention, the super-saturation method for information-media, in which in conjunction with the first broadcaster the second broadcaster accepting the offsite content presentation includes receiving a graphic item.

According to an embodiment of the present invention, the super-saturation method for information-media, in which in conjunction with the first broadcaster the second broadcaster accepting the offsite content presentation includes receiving a multimedia presentation.

According to an embodiment of the present invention, the super-saturation method for information-media, in which in conjunction with the first broadcaster the second broadcaster accepting the offsite content presentation includes receiving an audio presentation.

According to an embodiment of the present invention, the super-saturation method for information-media, in which in conjunction with the first broadcaster the second broadcaster accepting the offsite content presentation includes receiving a banner.

According to an embodiment of the present invention, the super-saturation method for information-media, in which in conjunction with the first broadcaster the second broadcaster accepting the offsite content presentation for the recognized visitor includes the second broadcaster dropping the offsite content presentation into the browser of the visitor.

According to an embodiment of the present invention, the super-saturation method for information-media, in which in conjunction with the first broadcaster the second broadcaster accepting the offsite content presentation for the recognized visitor includes the second broadcaster sending the browser of the visitor to fetch the offsite content presentation.

According to an embodiment of the present invention, the super-saturation method for information-media, in which in conjunction with the first broadcaster the second broadcaster accepting the offsite content presentation for the recognized visitor includes the second broadcaster sending the offsite content presentation to the recognized visitor via the second information-media.

According to an embodiment of the present invention, the super-saturation method for information-media, the second information-media and the first information-media constitute a single media. For example, a lucrative section (advertising sold out) and a non-lucrative section (advertising space available) of a single Internet web-site.

Various descriptive and definitive comments made regarding the first information-media apply $_{mutatis\ mutandis}$ to the second information-media. While these media can be different types of media, these can equally be the same media. This will commonly be the situation when using the Internet but this applies also to, for example, telephone, wireless and cellular networks. In addition, it is also feasible that the content provider is the first information-media; since it is not specifically necessary for a host and a service provider and a site to be the same entity.

According to an embodiment of the present invention, the super-saturation method for information-media, the second information-media is an Internet data communications media.

According to a variation of an embodiment of the present invention, the super-saturation method for in information-media, the Internet data communications media includes at least one content presentation of a plurality of content presentations such as a web site or a multi-media down load or a channel of updated information or web radio or web television.

According to an embodiment of the present invention, the super-saturation method for information-media, the second information-media is an interactive data communications media.

According to a variation of an embodiment of the present invention, the super-saturation method for information-media, the interactive data communication media is a telephone communication media.

According to a variation of an embodiment of the present invention, the super-saturation method for information-media, the interactive data communication media is a wireless communication media.

According to a variation of an embodiment of the present invention, the super-saturation method for information-media, the interactive data communication media is a cellular communication media.

According to an embodiment of the present invention, the super-saturation method for information-media, the second information-media is a broadcasting media.

According to an embodiment of the present invention, the super-saturation method for information-media, the second information-media is a hyperlink.

According to an embodiment of the present invention, the super-saturation method for information-media, the second information-media is a banner.

According to an embodiment of the present invention, the super-saturation method for information-media, in which recognizing a visitor to the second information-media includes accessing a cookie.

According to an embodiment of the present invention, the super-saturation method for information-media, in which recognizing a visitor to the second information-media includes receiving an identification message.

According to an embodiment of the present invention, the super-saturation method for information-media, in which recognizing a visitor to the second information-media includes querying a notification in a telephone system database.

According to an embodiment of the present invention, the super-saturation method for information-media, in which recognizing a visitor to the second information-media includes identifying a message identifier record in a database.

According to an embodiment of the present invention, the super-saturation method for information-media, in which recognizing a visitor to the second information-media includes receiving a credit warning in a credit card database.

According to an embodiment of the present invention, the super-saturation method for information-media, in which recognizing a visitor to the second information-media includes searching for a personal notice in a public service database.

According to an embodiment of the present invention, the super-saturation method for information-media, in which recognizing a visitor to the second information-media includes querying a legal instrument in a legally empowered body database.

According to an embodiment of the present invention, the super-saturation method for information-media, in which recognizing a visitor to the second information-media includes searching for a message in (conjunction with the use of) a cellular telephone SIM card.

According to an embodiment of the present invention, the super-saturation method for information-media, in which recognizing a visitor to the second information-media includes finding a notification into a wireless communication service database.

It is an essential part of the present invention that in recognizing a visitor to the second information-media, a notification is found by the second broadcaster that had been placed in the visitor by the first broadcaster. The second broadcaster needed to provide this identification and recognition system to facilitate the concept of offsite advertising and the inserting of other notifications. There is an equivalence in these notifications, for example of a cookie in an Internet browser, a message emanating from a cellular telephone media database, a credit card warning emanating from a credit card users database, etc.

According to an embodiment of the present invention, the contracting structure for facilitating super-saturation of an information-media, a content provider is a store.

According to an embodiment of the present invention, the contracting structure for facilitating super-saturation of an information-media, a content provider is a service provider.

According to an embodiment of the present invention, the contracting structure for facilitating super-saturation of an information-media, a content provider is an advertisement provider.

According to an embodiment of the present invention, the contracting structure for facilitating super-saturation of an information-media, a content provider is a notification provider.

In describing a content provider as a store, a service provider, an advertisement provider, a notification provider, these are all enterprises or individuals wishing to provide notifications to viewers, listeners and readers of a variety of media. In addition, first broadcaster can also be the content provider. Motivation for these content providers relate to commercial, interpersonal, legal, institutional, advisory and many other matters.

According to an embodiment of the present invention, the contracting structure for facilitating super-saturation of an information-media, an identified visitor is a visitor recognized by a cookie in a browser of the visitor.

According to an embodiment of the present invention, the contracting structure for facilitating super-saturation of an information-media, an identified visitor is a visitor recognized by a tag placed in a memory media associated with the visitor.

Details relating to an identified visitor are generally described in terms of tags and tagging of visitors with regard to a super-saturation method for information-media and apply mutatis mutandis to the contracting structure for facilitating super-saturation of an information-media.

The present invention relates also to a computer program product including a computer usable media having computer readable program code embodied therein for a super-saturation method for information-media, the computer readable program code in said article of manufacture including:

a) first computer readable program code for causing an agency to facilitate visitor identification;

b) tied to the first computer readable software, second computer readable program code for causing, in conjunction with the agency, a first broadcaster of the first information-media to tag a preponderance of visitors to the first information-media with a tag; and c) tied to the second computer readable software, third computer readable program code for causing, in conjunction with the agency, a second broadcaster of a second information-media to recognize a visitor to the second information-media as having the tag, and thereupon by proxy—either in conjunction with the agency or in conjunction with the first broadcaster—the second broadcaster to accept the offsite content presentation for the recognized visitor.

The present invention relates in addition to a computer program product including a computer usable media having computer readable program code embodied therein for a super-saturation method for information-media, the computer readable program code in said article of manufacture including a computer readable program code for causing an agency to facilitate visitor identification.

The present invention relates further to a computer program product including a computer usable media having computer readable program code embodied therein for a super-saturation method for information-media, the computer readable program code in said article of manufacture including a computer readable program code for causing, in conjunction with the agency, a first broadcaster of the first information-media to tag a preponderance of visitors to the first information-media with a tag.

The present invention relates furthermore to a computer program product including a computer usable media having computer readable program code embodied therein for a super-saturation method for information-media, the computer readable program code in said article of manufacture including a computer readable program code for causing, in conjunction with the agency, a second broadcaster of a second information-media to recognize a visitor to the second information-media as having the tag, and thereupon by proxy—either in conjunction with the agency or in conjunction with the first broadcaster—the second broadcaster to accept the offsite content presentation for the recognized visitor.

The present invention relates also to a computer program product including a computer usable media having computer readable program code embodied therein for a contracting structure for facilitating super-saturation of an information-media the computer readable program code in said article of manufacture including a a) first computer readable program code for causing, a first contractual agreement between an agency offering an offsite content presentation for a first information-media and a content provider accepting said offering;
   i) whereby the agency provides a facilitated delivery of a content of the first content provider to an identified visitor visiting offsite; and
   ii) whereby the content provider pays for the facilitated delivery;

b) tied to the first computer readable software, second computer readable program code for causing a second contractual agreement between the agency and a first broadcaster of the first information-media;
   i) whereby the first broadcaster provides a facilitated tagging of a preponderance of visitors to the first information-media; and
   ii) whereby the agency provides a facilitated offsite placement of a content deriving from the first contractual agreement, the agency paying the first broadcaster for substantially each such facilitated placement; and c) tied to the second computer readable software, third computer readable program code for causing a third contractual agreement between the agency and a second broadcaster of a second information-media;
   i) whereby the second broadcaster provides a facilitated recognizing of a visitor to the second information-media as having the tag, and thereupon by proxy— either in conjunction with the agency or in conjunction with the first broad-caster the second broadcaster provides a facilitated accepting the offsite content presentation for the recognized visitor; and
   ii) whereby the agency pays for the facilitated delivery accepting.

The present invention relates in addition to a computer program product including a computer usable media having computer readable program code embodied therein for a contracting structure for facilitating super-saturation of an information-media the computer readable program code in said article of manufacture including a first computer readable program code for causing, a first contractual agreement between an agency offering an offsite content presentation for a first information-media and a content provider accepting said offering: a first contractual agreement between an agency offering an offsite content presentation for a first information-media and a content provider accepting said offering;
   a) whereby the agency provides a facilitated delivery of a content of the first content provider to an identified visitor visiting offsite; and
   b) whereby the content provider pays for the facilitated delivery.

The present invention relates further to a computer program product including a computer usable media having computer readable program code embodied therein for a contracting structure for facilitating super-saturation of an information-media the computer readable program code in said article of manufacture including a second computer readable program code for causing a second contractual agreement between the agency and a first broadcaster of the first information-media;
   a) whereby the first broadcaster provides a facilitated tagging of a preponderance of visitors to the first information-media; and
   b) whereby the agency provides a facilitated offsite placement of a content deriving from the first contractual agreement, the agency paying the first broadcaster for substantially each such facilitated placement.

The present invention relates to a computer program product including a computer usable media having computer readable program code embodied therein for a contracting structure for facilitating super-saturation of an information-media the computer readable program code in said article of manufacture including a second computer readable program code for causing a third contractual agreement between the agency and a second broadcaster of a second information-media:
   a) whereby the second broadcaster provides a facilitated recognizing of a visitor to the second information-media as having the tag, and thereupon by proxy—either in conjunction with the agency or in conjunction with the first broadcaster—the second broadcaster provides a facilitated accepting the offsite content presentation for the recognized visitor; and
   b) whereby the agency pays for the facilitated delivery accepting.

The present invention also relates to a program storage device readable by machine, tangibly embodying a program of instructions executable by the machine to perform method steps for a super-saturation method for information-media, said method steps including:
   a) an agency facilitating visitor identification;
   b) in conjunction with the agency, a first broadcaster of the first information-media tagging a preponderance of visitors to the first information-media with a tag; and
   c) in conjunction with the agency, a second broadcaster of a second information-media recognizing a visitor to the second information-media as having the tag, and thereupon by proxy—either in conjunction with the agency or in conjunction with the first broadcaster—the second broadcaster provides a facilitated accepting the offsite content presentation for the recognized visitor.

The present invention relates in addition to a program storage device readable by machine, tangibly embodying a program of instructions executable by the machine to perform method steps for a super-saturation method for information-media, said method step including an agency facilitating visitor identification.

The present invention further relates to a program storage device readable by machine, tangibly embodying a program of instructions executable by the machine to perform method steps for a super-saturation method for information-media, said method step including in conjunction with the agency, a first broadcaster of the first information-media tagging a preponderance of visitors to the first information-media with a tag.

The present invention relates furthermore to a program storage device readable by machine, tangibly embodying a program of instructions executable by the machine to perform method steps for a super-saturation method for information-media, said method step including in conjunction with the agency, a second broadcaster of a second information-media recognizing a visitor to the second information-media as having the tag, and thereupon by proxy—either in conjunction with the agency or in conjunction with the first broadcaster—the second broadcaster accepting the offsite content presentation for the recognized visitor.

The present invention further also relates to a program storage device readable by machine, tangibly embodying a program of instructions executable by the machine to perform method steps for a contracting structure for facilitating super-saturation of an information-media, said method steps including:
   a) a first contractual agreement between an agency offering an offsite content presentation for a first information-media and a content provider accepting said offering;
     i) whereby the agency provides a facilitated delivery of a content of the first content provider to an identified visitor visiting offsite; and
     ii) whereby the content provider pays for the facilitated delivery;
   b) a second contractual agreement between the agency and a first broadcaster of the first information-media;
     i) whereby the first broadcaster provides a facilitated tagging of a preponderance of visitors to the first information-media; and
     ii) whereby the agency provides a facilitated offsite placement of a content deriving from the first contractual agreement, the agency paying the first broadcaster for substantially each such facilitated placement; and
   c) a third contractual agreement between the agency and a second broadcaster of a second information-media;
     i) whereby the second broadcaster provides a facilitated recognizing of a visitor to the second information-media as having the tag, and thereupon by proxy—either in conjunction with the agency or in conjunction with the first broadcaster the second broadcaster accepting the offsite content presentation for the recognized visitor; and
     ii) whereby the agency pays for the facilitated delivery accepting.

The present invention relates to a program storage device readable by machine, tangibly embodying a program of instructions executable by the machine to perform method steps for a contracting structure for facilitating super-saturation of an information-media, said method including: a first contractual agreement between an agency offering an offsite content presentation for a first information-media and a content provider accepting said offering:

a) whereby the agency provides a facilitated delivery of a content of the first content provider to an identified visitor visiting offsite; and b) whereby the content provider pays for the facilitated delivery.

The present invention also relates to a program storage device readable by machine, tangibly embodying a program of instructions executable by the machine to perform method steps for a contracting structure for facilitating super-saturation of an information-media, said method including a second contractual agreement between the agency and a first broadcaster of the first information-media:

a) whereby the first broadcaster provides a facilitated tagging of a preponderance of visitors to the first information-media; and b) whereby the agency provides a facilitated offsite placement of a content deriving from the first contractual agreement, the agency paying the first broadcaster for substantially each such facilitated placement.

The present invention in addition relates to a program storage device readable by machine, tangibly embodying a program of instructions executable by the machine to perform method steps for a contracting structure for facilitating super-saturation of an information-media, said method including a third contractual agreement between the agency and a second broadcaster of a second information-media:

a) whereby the second broadcaster provides a facilitated recognizing of a visitor to the second information-media as having the tag, and thereupon by proxy— either in conjunction with the agency or in conjunction with the first broadcaster—the second broadcaster provides a facilitated accepting the offsite content presentation for the recognized visitor; and b) whereby the agency pays for the facilitated delivery accepting.

What is claimed is:

1. A super-saturation method for information-media, whereby a second information-media broadcaster in conjunction with an agency extends a content presentation of a first broadcasters beyond a predetermined information-media saturation threshold for content presentation of the first broadcaster, the method including the steps of:

a) facilitating visitor identification by an agency;

b) tagging, by a first broadcaster of a first information-media in conjunction with the agency, a preponderance of visitors to the first information-media with a tag;

c) recognizing, by a second broadcaster of a second information-media in conjunction with the agency, a visitor to the second information-media as having a tag;

d) accepting, by the second broadcaster in conjunction with either the agency or the first broadcaster, an offsite content presentation for the recognized visitor; and e) presenting the offsite content to the recognized visitor.

2. The super-saturation method for information-media according to claim 1 wherein the step of facilitating visitor identification by an agency includes offering an offsite content presentation for a first information media.

3. The super-saturation method for information-media according to claim 2 wherein offering includes selling.

4. The super-saturation method for information-media according to claim 2 wherein offering includes renting.

5. The super-saturation method for information-media according to claim 2, wherein offering includes leasing.

6. The super-saturation method for information-media according to claim 2 wherein offering includes trading.

7. The super-saturation method for information-media according to claim 2 wherein offering includes proposing for payment.

8. The super-saturation method for information-media according to claim 1 wherein the agency is an advertising agency.

9. The super-saturation method for information-media according to claim 1 wherein the agency is a credit bureau.

10. The super-saturation method for information-media according to claim 1 wherein the agency is a public service organization.

11. The super-saturation method for information-media according to claim 1 wherein the agency is a legally empowered body.

12. The super-saturation method for information-media according to claim 1 wherein the agency is a media service provider.

13. The super-saturation method for information-media according to claim 1 wherein the agency is a cellular telephone service provider.

14. The super-saturation method for information-media according to claim 1 wherein the agency is a wireless communication service provider.

15. The super-saturation method for information-media according to claim 1 wherein the offsite content presentation is an advertisement presentation.

16. The super-saturation method for information-media according to claim 1 wherein the offsite content presentation is a notification.

17. The super-saturation method for information-media according to claim 16 wherein the notification is a public service announcement.

18. The super-saturation method for information-media according to claim 16 wherein the notification is a personal reminder.

19. The super-saturation method for information-media according to claim 16 wherein the notification is a judicial instrument.

20. The super-saturation method for information-media according to claim 16 wherein the notification is a credit warning.

21. The super-saturation method for information-media according to claim 1 wherein the offsite content presentation is a graphic item.

22. The super-saturation method for information-media according to claim 1 wherein the offsite content presentation is multimedia.

23. The super-saturation method for information-media according to claim 1 wherein the offsite content presentation is audio.

24. The super-saturation method for information-media according to claim 1 wherein the offsite content presentation is a banner.

25. The super-saturation method for information-media according to claim 1 wherein the first information-media is Internet data communications protocol based.

26. The super-saturation method for information-media according to claim 25 wherein the Internet data communications media includes at least one content presentation of a plurality of content presentations.

27. The super-saturation method for information-media according to claim 1 wherein the first information-media is interactive data communications protocol based.

28. The super-saturation method for information-media according to claim 27 wherein interactive data communication is a telephone communication service.

29. The super-saturation method for information-media according to claim 27 wherein the interactive data communication is a wireless communication service.

30. The super-saturation method for information-media according to claim 27 wherein the interactive data communication is a cellular communication service.

31. The super-saturation method for information-media according to claim 1 wherein the first information-media is a broadcasting system.

32. The super-saturation method for information-media according to claim 1 wherein the first information-media is a hyperlink.

33. The super-saturation method for information-media according to claim 1 wherein the first information-media is a banner.

34. The super-saturation method for information-media according to claim 1 wherein the first broadcaster is associated with an interactive data communication media.

35. The super-saturation method for information-media according to claim 1 wherein the first broadcaster is a Web site of an Internet data communication server.

36. The super-saturation method for information-media according to claim 1 wherein the first broadcaster is an advertising media.

37. The super-saturation method for information-media according to claim 1 wherein the first broadcaster is a credit agency.

38. The super-saturation method for information-media according to claim 1 wherein the first broadcaster is a credit control agency for a credit card organization.

39. The super-saturation method for information-media according to claim 1 wherein the first broadcaster is a banner promotion agency.

40. The super-saturation method for information-media according to claim 1 wherein the first broadcaster is a public service organization.

41. The super-saturation method for information-media according to claim 1 wherein the first broadcaster is a legally empowered body.

42. The super-saturation method for information-media according to claim 1 wherein the first broadcaster is a media agency.

43. The super-saturation method for information-media according to claim 1 wherein the first broadcaster is a cellular telephone service provider.

44. The super-saturation method for information-media according to claim 1 wherein the first broadcaster is a wireless communication media.

45. The super-saturation method for information-media according to claim 1 wherein the first broadcaster is a hyperlink.

46. The super-saturation method for information-media according to claim 1 wherein tagging the preponderance of visitors includes placing a cookie into the web browser of substantially each visitor of the preponderance of visitors.

47. The super-saturation method for information-media according to claim 46 wherein the placing of a cookie into the web browser of substantially each visitor of the preponderance of visitors occurs when the visitor requests a page.

48. The super-saturation method for information-media according to claim 1 wherein tagging the preponderance of visitors includes for substantially each visitor of the preponderance of visitors placing a notification into a telephone system database.

49. The super-saturation method for information-media according to claim 1 wherein tagging the preponderance of visitors includes for substantially each visitor of the preponderance of visitors placing a message identifier record into a database for the preponderance of visitors.

50. The super-saturation method for information-media according to claim 1 wherein tagging the preponderance of visitors includes for substantially each visitor of the preponderance of visitors placing a credit warning into a credit card database.

51. The super-saturation method for information-media according to claim 1 wherein tagging the preponderance of visitors includes for substantially each visitor of the preponderance of visitors placing a personal notice into a public service database.

52. The super-saturation method for information-media according to claim 1 wherein tagging the preponderance of visitors includes for substantially each visitor of the preponderance of visitors sending a legal instrument into a legally empowered body database.

53. The super-saturation method for information-media according to claim 1 wherein tagging the preponderance of visitors includes for substantially each visitor of the preponderance of visitors placing a message into a cellular telephone SIM card.

54. The super-saturation method for information-media according to claim 1 wherein tagging the preponderance of visitors includes for substantially each visitor of the preponderance of visitors placing a notification into a wireless communication service database.

55. The super-saturation method for information-media according to claim 1 wherein substantially each visitor of the preponderance of visitors to the first information-media is classified as a preferred visitor.

56. The super-saturation method for information-media according to claim 55 wherein the preferred visitor stays at the first information-media for at least a predetermined period of time.

57. The super-saturation method for information-media according to claim 55 wherein the preferred visitor spends at least a predetermined amount of money at the first information-media.

58. The super-saturation method for information-media according to claim 1 wherein the tag is a cookie.

59. The super-saturation method for information-media according to claim 1 wherein the tag is an identification message.

60. The super-saturation method for information-media according to claim 1 wherein the tag is a notification in a telephone system database.

61. The super-saturation method for information-media according to claim 1 wherein the tag is a message identifier record in a database.

62. The super-saturation method for information-media according to claim 1 wherein the tag is a credit warning in a credit card database.

63. The super-saturation method for information-media according to claim 1 wherein the tag is a personal notice in a public service database.

64. The super-saturation method for information-media according to claim 1 wherein the tag is a legal instrument in a legally empowered body database.

65. The super-saturation method for information-media according to claim 1 wherein the tag is a message in a cellular telephone SIM card.

66. The super-saturation method for information-media according to claim 1 wherein the tag is a notification into a wireless communication service database.

67. The super-saturation method for information-media according to claim 1 wherein the second broadcaster is associated with an interactive data communication media.

68. The super-saturation method for information-media according to claim 1 wherein the second broadcaster is a Web site on an Internet data communication media.

69. The super-saturation method for information-media according to claim 1 wherein the second broadcaster is an advertising media.

70. The super-saturation method for information-media according to claim 1 wherein the second broadcaster is a credit agency.

71. The super-saturation method for information-media according to claim 1 wherein the second broadcaster is a credit control agency for a credit card organization.

72. The super-saturation method for information-media according to claim 1 wherein the second broadcaster is a banner promotion agency.

73. The super-saturation method for information-media according to claim 1 wherein the second broadcaster is a public service organization.

74. The super-saturation method for information-media according to claim 1 wherein the second broadcaster is a legally empowered body.

75. The super-saturation method for information-media according to claim 1 wherein the second broadcaster is a media agency.

76. The super-saturation method for information-media according to claim 1 wherein the second broadcaster is a cellular telephone service provider.

77. The super-saturation method for information-media according to claim 1 wherein the second broadcaster is a wireless communication media.

78. The super-saturation method for information-media according to claim 1 wherein the second broadcaster is a hyperlink.

79. The super-saturation method for information-media according to claim 1 wherein the second information-media and the first information-media constitute a single media.

80. The super-saturation method for information-media according to claim 1 wherein the second information-media is Internet data communications protocol based.

81. The super-saturation method for information-media according to claim 80 wherein the Internet data communications media includes at least one content presentation of a plurality of content presentations.

82. The super-saturation method for information-media according to claim 1 wherein the second information-media is interactive data communications protocol based.

83. The super-saturation method for information-media according to claim 82 wherein interactive data communication is a telephone communication service.

84. The super-saturation method for information-media according to claim 82 wherein interactive data communication is a wireless communication service.

85. The super-saturation method for information-media according to claim 82 wherein interactive data communication is a cellular communication service.

86. The super-saturation method for information-media according to claim 1 wherein the second information-media is a broadcasting media.

87. The super-saturation method for information-media according to claim 1 wherein the second information-media is a hyperlink.

88. The super-saturation method for information-media according to claim 1 wherein the second information-media is a banner.

89. The super-saturation method for information-media according to claim 1 wherein recognizing the visitor to the second information-media includes accessing a cookie.

90. The super-saturation method for information-media according to claim 1 wherein recognizing the visitor to the second information-media includes receiving an identification message.

91. The super-saturation method for information-media according to claim 1 wherein recognizing the visitor to the second information-media includes querying a notification in a telephone system database.

92. The super-saturation method for information-media according to claim 1 wherein recognizing the visitor to the second information-media includes identifying a message identifier record in a database.

93. The super-saturation method for information-media according to claim 1 wherein recognizing the visitor to the second information-media includes receiving a credit warning in a credit card database.

94. The super-saturation method for information-media according to claim 1 wherein recognizing the visitor to the second information-media includes searching for a personal notice in a public service database.

95. The super-saturation method for information-media according to claim 1 wherein recognizing the visitor to the second information-media includes querying a legal instrument in a legally empowered body database.

96. The super-saturation method for information-media according to claim 1 wherein recognizing the visitor to the second information-media includes searching for a message in a cellular telephone SIM card.

97. The super-saturation method for information-media according to claim 1 wherein recognizing the visitor to the second information-media includes finding a notification into a wireless communication service database.

98. The super-saturation method for information-media according to claim 1 wherein, in conjunction with the agency, the second broadcaster accepting the offsite content presentation includes receiving an advertisement presentation.

99. The super-saturation method for information-media according to claim 1 wherein, in conjunction with the agency, the second broadcaster accepting the offsite content presentation includes receiving a public service announcement.

100. The super-saturation method for information-media according to claim 1 wherein, in conjunction with the agency, the second broadcaster accepting the offsite content presentation includes receiving a personal reminder.

101. The super-saturation method for information-media according to claim 1 wherein, in conjunction with the agency, the second broadcaster accepting the offsite content presentation includes receiving a judicial instrument.

102. The super-saturation method for information-media according to claim 1 wherein, in conjunction with the agency, the second broadcaster accepting the offsite content presentation includes receiving a credit warning.

103. The super-saturation method for information-media according to claim 1 wherein, in conjunction with the agency, the second broadcaster accepting the offsite content presentation includes receiving a graphic item.

104. The super-saturation method for information-media according to claim 1 wherein, in conjunction with the agency, the second broadcaster accepting the offsite content presentation includes receiving a multimedia presentation.

105. The super-saturation method for information-media according to claim 1 wherein, in conjunction with the agency, the second broadcaster accepting the offsite content presentation includes receiving an audio presentation.

106. The super-saturation method for information-media according to claim 1 wherein, in conjunction with the agency, the second broadcaster accepting the offsite content presentation includes receiving a banner.

107. The super-saturation method for information-media according to claim 1 wherein, in conjunction with the agency, the presenting the offsite content to the recognized visitor includes the second broadcaster sending the offsite content presentation to the browser of the visitor.

108. The super-saturation method for information-media according to claim 1 wherein, in conjunction with the agency, the presenting the offsite content to the recognized visitor includes the second broadcaster sending the browser of the visitor to fetch the offsite content presentation.

109. The super-saturation method for information-media according to claim 1 wherein, in conjunction with the agency, the presenting the offsite content to the recognized visitor includes the second broadcaster sending the offsite content presentation to the recognized visitor via the second-information media.

110. The super-saturation method for information-media according to claim 1 wherein, in conjunction with the first broadcaster, the second broadcaster accepting the offsite content presentation includes receiving an advertisement presentation.

111. The super-saturation method for information-media according to claim 1 wherein, in conjunction with the first broadcaster, the second broadcaster accepting the offsite content presentation includes receiving a public service announcement.

112. The super-saturation method for information-media according to claim 1 wherein, in conjunction with the first broadcaster, the second broadcaster accepting the offsite content presentation includes receiving a personal reminder.

113. The super-saturation method for information-media according to claim 1 wherein, in conjunction with the first broadcaster, the second broadcaster accepting the offsite content presentation includes receiving judicial instrument.

114. The super-saturation method for information-media according to claim 1 wherein, in conjunction with the first broadcaster, the second broadcaster accepting the offsite content presentation includes receiving a credit warning.

115. The super-saturation method for information-media according to claim 1 wherein, in conjunction with the first broadcaster, the second broadcaster accepting the offsite content presentation includes a receiving graphic item.

116. The super-saturation method for information-media according to claim 1 wherein, in conjunction with the first broadcaster, the second broadcaster accepting the offsite content presentation includes receiving a multimedia presentation.

117. The super-saturation method for information-media according to claim 1 wherein, in conjunction with the first broadcaster, the second broadcaster accepting the offsite content presentation includes receiving an audio presentation.

118. The super-saturation method for information-media according to claim 1 wherein, in conjunction with the first broadcaster, the second broadcaster accepting the offsite content presentation includes receiving a banner.

119. The super-saturation method for information-media according to claim 1 wherein, in conjunction with the first broadcaster, the presenting the offsite content to the recognized visitor includes the second broadcaster sending the offsite content presentation to the browser of the visitor.

120. The super-saturation method for information-media according to claim 1 wherein, in conjunction with the first broadcaster, the presenting the offsite content to the recognized visitor includes the second broadcaster directing the browser of the visitor to fetch the offsite content presentation.

121. The super-saturation method for information-media according to claim 1 wherein, in conjunction with the first broadcaster, the presenting the offsite content to the recognized visitor includes the second broadcaster sending the offsite content presentation to the recognized visitor via the second-information media.

122. A system including computer usable media having computer readable program code embodied therein for a super-saturation method for information-media, the computer readable program code, comprising:
   a) a first computer readable program code for causing an agency to facilitate visitor identification;
   b) a second computer readable program code for tagging, by a first broadcaster of a first information-media, in conjunction with the agency, a preponderance of visitors to the first information-media with a tag;
   c) a third computer readable program code for recognizing, by a second broadcaster of a second information-media, in conjunction with the agency, a visitor to the second information-media as having the tag; for accepting, by the second broadcaster in conjunction with either the agency or the first broadcaster, an offsite content presentation for the recognized visitor; and for presenting the offsite content to the recognized visitor.

123. A program storage device readable by machine, tangibly embodying a program of instructions executable by the machine to perform method steps for a super-saturation method for information-media, said method steps including:
   a) an agency offering an offsite content presentation for a first information-media;
   b) in conjunction with the agency, a first broadcaster of the first information-media tagging a preponderance of visitors to the first information-media with a tag; and
   c) in conjunction with the agency, a second broadcaster of a second information-media recognizing a visitor to the second information-media as having the tag, and thereupon by proxy—either in conjunction with the agency or in conjunction with the first broadcaster—the second broadcaster provides a facilitated accepting the offsite content presentation for the recognized visitor.

\* \* \* \* \*